United States Patent
Saa-Garriga et al.

(10) Patent No.: US 11,869,127 B2
(45) Date of Patent: Jan. 9, 2024

(54) IMAGE MANIPULATION METHOD AND APPARATUS

(71) Applicant: SAMSUNG ELECTRONICS CO., LTD., Suwon-si (KR)

(72) Inventors: Albert Saa-Garriga, Middlesex (GB); Alessandro Vandini, Middlesex (GB); Antoine Larreche, Middlesex (GB); Javed Rabbani Shah, Middlesex (GB); Prashant Sharma, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 17/612,053

(22) PCT Filed: May 14, 2020

(86) PCT No.: PCT/KR2020/006358
§ 371 (c)(1),
(2) Date: Nov. 17, 2021

(87) PCT Pub. No.: WO2020/235862
PCT Pub. Date: Nov. 26, 2020

(65) Prior Publication Data
US 2022/0207808 A1    Jun. 30, 2022

(30) Foreign Application Priority Data

May 17, 2019 (GB) ..................................... 1906992
Nov. 22, 2019 (GB) ..................................... 1917038
Feb. 13, 2020 (GB) ..................................... 2001953

(51) Int. Cl.
*G06T 11/60* (2006.01)
*G06V 10/74* (2022.01)
(Continued)

(52) U.S. Cl.
CPC .......... *G06T 11/60* (2013.01); *G06F 18/2413* (2023.01); *G06T 11/001* (2013.01);
(Continued)

(58) Field of Classification Search
CPC .... G06T 7/73; G06T 7/90; G06T 7/60; G06T 11/60; G06T 11/00; G06T 11/40;
(Continued)

(56) References Cited

U.S. PATENT DOCUMENTS 8,913,827 B1    12/2014  Fang
9,594,977 B2 *   3/2017  Lin ........................... G06T 7/60
(Continued)

FOREIGN PATENT DOCUMENTS

KR    10-2013-0141286 A    12/2013

OTHER PUBLICATIONS

J.-Y. Lee, et al.. "Automatic content-aware color and tone stylization", Proceedings of the IEEE Conference on Computer Vision and Pattern Recognition (CVPR'16), 2016, pp. 2470-2478 (Year: 2016).*
(Continued)

*Primary Examiner* — Jin Cheng Wang
(74) *Attorney, Agent, or Firm* — Sughrue Mion, PLLC

(57) ABSTRACT

A computer-implemented image manipulation apparatus and method (200) configured to receiving an input image (202) and a desired style. The method can obtain a representation (204) of the input image selected from a plurality of stored representations of a plurality of images, wherein each said representation comprises data describing a set of image features. The method can modify image features in the obtained representation to correspond to the input image and/or the desired style to produce a modified representation (207), and render a reference image (209) based on the modified representation. A manipulated image is generated by performing a style transfer operation (210) on the input
(Continued)

image using the rendered reference image. Embodiments may access a data store to find a group of stored images based on similarity between image content descriptors of groups of stored images and those of an input image to retrieve a stored reference image.

15 Claims, 9 Drawing Sheets

(51) Int. Cl.
  *G06T 11/00* (2006.01)
  *G06F 18/2413* (2023.01)
  *G06T 11/40* (2006.01)
(52) U.S. Cl.
  CPC ............ *G06T 11/40* (2013.01); *G06V 10/761* (2022.01); *G06T 2207/20221* (2013.01)
(58) Field of Classification Search
  CPC ........ G06T 11/001; G06T 2207/20221; G06V 10/761; G06V 3/045; G06V 3/047; G06F 18/211
  See application file for complete search history.

(56) References Cited

U.S. PATENT DOCUMENTS

| | | | |
|---|---|---|---|
| 9,959,484 | B2 | 5/2018 | Wang et al. |
| 10,521,892 | B2 | 12/2019 | Sunkavalli et al. |
| 10,885,701 | B1 | 1/2021 | Patel |
| 2012/0027269 | A1 | 2/2012 | Fidaleo et al. |
| 2016/0364625 | A1* | 12/2016 | Lin ........................... G06T 7/60 |
| 2017/0085785 | A1 | 3/2017 | Corcoran et al. |
| 2017/0139572 | A1* | 5/2017 | Sunkavalli .......... G06F 3/04845 |
| 2017/0169620 | A1 | 6/2017 | Bleiweiss et al. |
| 2018/0061083 | A1 | 3/2018 | Suzuki et al. |
| 2018/0357800 | A1* | 12/2018 | Oxholm ................ G06T 11/001 |
| 2019/0228587 | A1* | 7/2019 | Mordvintsev ........... G06T 19/20 |
| 2019/0236814 | A1* | 8/2019 | Shlens ..................... G06N 3/04 |
| 2019/0370936 | A1* | 12/2019 | Zhang ...................... G06T 3/40 |
| 2020/0151849 | A1* | 5/2020 | Liao .......................... G06T 5/50 |
| 2020/0219274 | A1* | 7/2020 | Afridi .................... G06N 20/00 |
| 2020/0226724 | A1* | 7/2020 | Fang ..................... G06F 18/214 |
| 2020/0242823 | A1* | 7/2020 | Gehlaut .................. G06T 11/40 |
| 2020/0258204 | A1* | 8/2020 | Fang ..................... G06T 3/0012 |
| 2020/0286273 | A1* | 9/2020 | Chen ....................... G06T 11/60 |
| 2020/0327709 | A1* | 10/2020 | Liu ......................... G06V 10/82 |

OTHER PUBLICATIONS

Saa-Garriga, Albert et al., "Assisted Real-time On-Device Color Editing", May 17, 2019. (3 pages total).

Laffont, Pierre-Yves et al., "Transient attributes for high-level understanding and editing of outdoor scenes", ACM Transaction on Graphics, ACM, New York. NY, USA, vol. 33, No. 4, Jul. 27, 2014, pp. 1-11, XP058051916. (11 pages total).

Liu, Yiming et al., "AutoStyle: Automatic Style Transfer from Image Collections to Users' Images", Computer Graphics Forum, vol. 33, No. 4, Jul. 1, 2014, pp. 21-31, XP055280477. (11 pages total).

Wu, Jiajun et al., Neural Scene De-rendering, IEEE Computer Society Conference on Computer Vision and Pattern Recognition, IEEE, Jul. 21, 2017, pp. 7035-7043. (9 pages total).

Wu, Fuzhang et al., "Content-Based Colour Transfer", Computer Graphics Forum, Wiley, 2013, vol. 32, No. 1, pp. 190-203. (13 ages total).

International Search Report (PCT/ISA/210) dated Aug. 19, 2020 by the International Searching Authority in counterpart International Patent Application No. PCT/KR2020/006358.

Written Opinion (PCT/ISA/237) dated Aug. 19, 2020 by the International Searching Authority in counterpart International Patent Application No. PCT/KR2020/006358.

Communication dated Mar. 12, 2020 by the Intellectual Property Office of Great Britain in counterpart British Patent Application No. GB1917038.0.

Communication dated Aug. 7, 2020 by the Intellectual Property Office of Great Britain in counterpart British Patent Application No. GB2001953.5.

\* cited by examiner

IMAGE MANIPULATION METHOD AND APPARATUS

TECHNICAL FIELD

The present invention relates to image manipulation.

BACKGROUND ART

Image manipulation involves editing images using computer vision and graphics algorithms. Style transfer is a known type of image manipulation that aims to apply a desired style to an input image while preserving the original content of the input image. For example, the input image may be manipulated to adopt the appearance or visual style of another image, called the "reference image".

If a reference image is significantly different from an input image then the results of the style transfer can be of reduced quality. For example, a reference image comprising a nature landscape will not be compatible with a city landscape input image. It is therefore desirable to have a reference image that has good visual similarities to the input image.

It has also been proven and shown in literature that to obtain the best possible result from style transfer, colour transfer or image transformation based on a reference image it is beneficial to have very similar semantics in the input image and the reference image. An example relating to image colorization can be seen in "Deep Exemplar-based Colorization" by Mingming He, Dongdong Chen, Jing Liao, Pedro V. Sander, Lu Yuan (https://arxiv.org/abs/1807.06587v2), where the best result was obtained when both the input and reference images shared semantics and it is possible to use an image retrieval system to enforce this. For a colorization problem if it is desired to colorize a grayscale portrait picture where there are many ambiguities regarding which colour to assign to each of the shades of grey, it is better to solve these ambiguities by imitating the colour distribution found in another portrait, rather than doing so from a different type of picture, e.g. an image of a car or a mountain.

DISCLOSURE OF INVENTION

Technical Problem

Thus, semantics play an important role in obtaining a realistic result and image retrieval is a good solution for obtaining suitable reference images. However, in the real world it is impossible to store a perfect reference image for each possible input image that an image manipulation system may process.

Embodiments of the present invention aim to address at least one of the above problems and provide improved image manipulation in an efficient manner.

Solution to Problem

According to a first aspect of the present invention there is provided a computer-implemented image manipulation method comprising: receiving an input image; receiving a desired style to be transferred to the input image; obtaining a representation of the input image selected from a plurality of stored representations of a plurality of images, wherein each said representation comprises data describing a set of image features, modifying at least one of the set of image features in the obtained representation to correspond to the input image and/or the desired style to produce a modified representation; rendering a reference image based on the modified representation, and generating a manipulated image by performing a style transfer operation on the input image using the reference image.

The representations may comprise statistical representations, wherein the image features of the representations may comprise common features of the plurality of images identified by a content analysis method performed on the plurality of images. The content analysis method may involve a statistical system that builds the statistical representations of the plurality of images. The statistical system can comprise a machine learning technique that learns a distribution of the identified common features across the plurality of images, e.g. by using a dimensionality reduction process or the like.

The plurality of images may comprise a dataset of example images of a particular type. The input image may be of a same type as the plurality of images. Examples of the type can comprise portrait, landscape, etc. The set of image features may comprise principal features that change across the plurality of images/dataset, such as components of deformations (e.g. shape, pose and expression) for face/portrait type of images.

The step of rendering the reference image may comprise a reverse of the process used to generate the statistical representations of the images. The reference image may comprise a synthetic rendering of the input image. For example, the reference images may comprise a 3D synthetic rendering/version of a photographed face in the input image.

The step of obtaining the representation of the input image may comprise finding a said representation amongst the plurality of representations that has a greatest visual similarity to the input image, e.g. using a similarity measurement such as Nearest Neighbours.

The desired style may comprise a set of image features, and each of the image features of the desired style may have an associated value. The desired style may be based on a style image that provides the value for each of the image features. Each of the image features of the obtained representation may have an associated value describing a property of the image feature (e.g. lighting conditions; pose of subject; identity of subject; morphological factors; emotion, etc). The step of modifying the at least one of the set of image features in the obtained representation may comprise modifying the value of the image feature of the obtained representation to correspond to a said value of a corresponding said image feature in the input image and/or the desired style.

The method may further comprise outputting the manipulated image, e.g. for storage or transfer.

According to another aspect of the present invention there is provided apparatus configured to perform image manipulation, the apparatus comprising: a processor configured to: receive an input image; receive a desired style to be transferred to the input image; obtain a representation of the input image selected from a plurality of representations of a plurality of images, wherein each said representation comprises data describing a set of image features, modify at least one of the set of image features in the obtained representation to correspond to the input image and/or the desired style to produce a modified representation; render a reference image based on the modified representation, and generate a manipulated image by performing a style transfer operation on the input image using the reference image.

The apparatus may comprise a mobile computing device, such as a smartphone.

Given a style transfer algorithm that requires a reference image, embodiments can also provide an advantageous/optimal reference image for a particular input image using a statistical system. This can offer better results for the given input image and automatically provide an optimal reference for the input image. Embodiments can maintain an image retrieval data store that is used for style transfer according to user demands or behaviour, thereby reducing the memory requirements for storing the dataset. Additionally, embodiments may create a two level database and, by understanding user needs, can cache part of this database in a user device to minimize network data transfers/consumption. Embodiments can provide a data store relating to reference images that can be used by an image manipulation/style transfer system to obtain the best possible reference image for a specific input image. The data store can be created using user data, e.g. by providing a list of inputs in which they are interested. This can allow the size of the data store to be contained to the user's interest(s). Additionally, the user-based data can be taken into consideration in order to have a smaller version of the overall data store stored on the user's device, thereby reducing/minimizing network usage for all/some of the queries submitted by the user. Thus, embodiments can reduce memory requirements related to maintaining an image database and can also reduce data transfer (network activity) by creating a cache comprising a subset of the database on the user side.

According to an additional or alternative aspect of the present invention there is provided a computer-implemented image manipulation method comprising: receiving an input image; obtaining a set of image content descriptors (d) for the input image; accessing a data store related to a plurality of stored images, the data store comprising a set of image content descriptors related to each of the plurality of stored images and a set of image capture characteristic descriptors (c) related to each of the plurality of stored images, the stored images being logically arranged in a plurality of groups, wherein the stored images in one said group have a same said set of image content descriptors and different said sets of image capture characteristics; finding at least one said group of stored images in the data store based on similarity between the set of image content descriptors of the groups of stored images and the set of image content descriptors of the input image; retrieving the sets of image capture characteristic descriptors associated with the stored images in the at least one found group of stored images; receiving a selection of a said set of image capture characteristic descriptors from amongst the retrieved sets of image capture characteristic descriptors; retrieving the stored image associated with the selected set of image capture characteristic descriptors, and generating a manipulated image by performing a style transfer operation on the input image using the retrieved stored image as a reference image, wherein the data store is created based on analysis of activities of at least one user in relation to images.

The data store may be created by storing sets of image content descriptors and sets of image capture characteristic descriptors determined to be likely to meet future user demands in relation to image manipulation. For example, the stored set of image content descriptors may comprise a set of image content descriptors associated with a stored image determined as one likely to be used as a reference image in a future style transfer operation (e.g. based on reference images used in historical/previous style transfer operations by the at least one user).

The method may comprise: determining a set of desired said image content descriptors of an image likely to meet future user demands; generating or obtaining a new image having the set of desired image content descriptors; obtaining a set of image capture characteristic descriptors of the new image, and adding the set of desired image content descriptors and the set of image capture characteristic descriptors obtained for the new image to the data store.

The determining the set of desired said image content descriptors may comprise statistical analysis of a plurality of existing stored images. The plurality of existing stored images may comprise images created, stored and/or accessed by a user of the device executing the image manipulation method, and/or images created, stored and/or accessed by a plurality of other users. The image content descriptors may comprise numerical values and the statistical analysis may comprise finding an average value of the image content descriptors of the plurality of stored images.

The set of image capture characteristic descriptors of the new image may be generated from metadata of the new image, and/or using an image analysis process, such as colour analysis.

The new image may be obtained by capturing a photograph using/following the set of desired image content descriptors. Alternatively, the new image may be synthetically generated using the set of desired image content descriptors, e.g. using a 3D renderer or a GAN (Generative Adversarial Network).

The method may comprise adding the image content descriptors (d) of the input image to at least one data store comprising indications of missing image-related data when the similarity between the set of image content descriptors (d) of the groups of stored images and the set of image content descriptors (d) of the input image meets a predetermined threshold. Some embodiments include a first said data store comprising indications of missing image-related data associated with the remote data store, and a second said data store comprising indications of missing image-related data associated with the local data store. The method may further comprise analysing the image content descriptors added to the at least one data store comprising indications of missing image-related data to determine the set of desired said image content descriptors and the set of image capture characteristic descriptors of an image likely to meet future user demands.

The step of accessing the data store may comprise selecting the data store from among a plurality of data stores. The plurality of data stores may comprise a remote data store and a local data store. The local data store may be stored on a user device that executes at least part of the method (or the local data store may be located at a near node of the user device). The selecting of the data store may comprise selecting the remote data store if the local data store is not present or available on the user device. The method may further comprise selecting the remote data store if the method does not initially find at least one said group of stored images in the local data store.

The local data store may comprise a subset of data of the remote data store. The subset may comprise said image content descriptors of stored images that match activities of the user of the user device, e.g. based on historical use or images stored in a user gallery on the user device.

A said image content descriptor may comprise a semantic description of the content of a said image. Examples include: class (e.g. landscape, office, room, portrait, etc); a histogram relating to features identified in the image; semantic embedding extracted from a neural network (e.g. variational autoencoder). The stored images in one said group may comprise a same said image having different capture characteristics.

The image content descriptor may be used as a primary key for searching the data store. In some embodiments the data store comprises a table having columns representing the image content descriptors and rows representing the image capture characteristic descriptors. The step of finding the most similar at least one said stored image may be based on Euclidian or Cosine distance from the input image to a said stored image in the table.

The set of image capture characteristic descriptors may be obtained from metadata of a said stored image, e.g. location of capture of the image; date/time of capture of the image, etc.

The method may further comprise outputting the manipulated image, e.g. for storage or transfer.

According to an additional or alternative aspect of the present invention there is provided a computer-implemented method of creating at least one data store adapted for image manipulation, the method comprising: creating a data store related to a plurality of stored images based on analysis of activities of at least one user in relation to images, wherein the data store comprises a set of image content descriptors related to each of a plurality of stored images and a set of image capture characteristic descriptors related to each of the plurality of stored images, the stored images being arranged in a plurality of groups, wherein the stored images in one said group have a same said set of image content descriptors and different said sets of image capture characteristics.

According to another aspect of the present invention there is provided apparatus comprising a processor configured to at least partially execute one or more methods substantially as described herein. The apparatus may comprise a mobile computing device, such as a smartphone.

According to another aspect of the present invention there is provided apparatus configured to create at least one data store adapted for image manipulation substantially as described herein.

According to an additional or alternative aspect of the present invention there is provided a computer-implemented method (e.g. performed by a server) of creating a data store adapted for image manipulation, wherein the data store is created based on analysis of activities of at least one user in relation to images.

This method may comprise: receiving, from a remote device, a set of image content descriptors for an input image (or receiving an input image and then obtaining a set of image content descriptors for the input image); accessing a data store related to a plurality of stored images, the data store comprising a set of image content descriptors related to each of the plurality of stored images and a set of image capture characteristic descriptors related to each of the plurality of stored images, the stored images being logically arranged in a plurality of groups, wherein the stored images in one said group have a same said set of image content descriptors and different said sets of image capture characteristics; finding at least one said group of stored images in the data store based on similarity between the set of image content descriptors of the groups of stored images and the set of image content descriptors of the input image; retrieving the sets of image capture characteristic descriptors associated with the stored images in the at least one found group of stored images, and transmitting the sets of image capture characteristic descriptors to the remote device.

According to another aspect of the present invention there is provided computer readable medium (or circuitry) storing a computer program to operate an image manipulation method substantially as described herein.

Correct lighting configurations can be fundamental for capturing studio quality selfies. Post-processing techniques have been proposed for assisting novice users to edit selfies' light properties. Both AI-based (Sun, Tiancheng, et al. "Single Image Portrait Relighting." arXiv preprint arXiv: 1905.00824 (2019)) and non AI-based techniques have been explored for this task. Similarly, make-up transfer techniques have been introduced for improving selfies. These techniques are based on Generative Adversarial Networks (Chang, Huiwen, et al. "Pairedcyclegan: Asymmetric style transfer for applying and removing makeup." Proceedings of the IEEE CVPR(2018)) which transfers a reference make-up style to the desired selfie. In addition, landscape editing methods using stylization allow realistic transfer of a reference style to a desired image (Li, Yijun, et al. "A closed-form solution to photorealistic image stylization." ECCV. 2018). In some embodiments a proposed color editing algorithm may be able to transfer color properties from a reference image to a desired image obtaining realistic image manipulation results for both selfie and landscape photographs. For this purpose, the algorithm may transfer colors only between regions of the reference and desired images that are semantically similar. This semantic information may be further used to select only suitable reference images for a given input image. Additionally, an upscaling algorithm based on linear regression which allows real-time computation of the solution on embedded devices may be used.

In some cases, the color editing algorithm may be based on mass transport. Given a color distribution from a reference image and a distribution from a desired image, the mass transport problem can comprise the minimization of the cost that occurs in modifying the reference distribution in order to match the desired distribution. This formulation has been used (in Bonneel, Nicolas, et al. "Sliced and radon wasserstein barycenters of measures." Journal of Mathematical Imaging and Vision 51.1 (2015): 22-45, and Pitie, Francois, Anil C. Kokaram, and Rozenn Dahyot. "N-dimensional probability density function transfer and its application to color transfer." Tenth IEEE International Conference on Computer Vision (ICCV'05) Volume 1. Vol. 2. IEEE, 2005) for performing color transfer in 3D and N-Dimensions. In some cases, the system can incorporate new dimensions to the mass transport problem, which can involve certain employed dimensions, i.e. maps, etc. An upsampling technique may also be used to speed up the computation of the mass transport. The upsampling can allow the mass transport to be performed on low resolution inputs, making the algorithm tractable for real-time mobile applications. The result of the mass transport can therefore be upscaled to the original input resolution by performing a multivariate linear regression. Alternative models have been proposed (Chen, Jiawen, et al. "Bilateral guided upsampling." ACM Transactions on Graphics (TOG) 35.6 (2016): 203) for learning affine transformations. The method can be divided into 3 different stages.

The maps used can include color channels, surface normal, position and semantic segmentation. Shu, Zhixin, et al. "Portrait lighting transfer using a mass transport approach." ACM Transactions on Graphics (TOG) 37.1 (2018): 2 provides details regarding the surface normal and position maps. Depending on the use case, different semantic maps are used. Each semantic map is represented by a confidence score in contrast to a binary representation (Li, Yijun, et al. "A closed-form solution to photorealistic image stylization." Proceedings of the European Conference on Computer Vision (ECCV). 2018). This factor can improve results in the presence of hard boundaries. In a selfie, 3 facial semantic maps can be considered: lips, right eye region and left eye region. These segmentations maps can be generated by combining color segmentation with morphological operators on detected face landmarks. In a landscape, 5 semantic maps can be considered: person, nature, man-made, sky and water. During candidate proposal, automatic candidate proposal can assess the user to select only suitable reference images for the given input image, e.g. nature landscape are not compatible with city landscape. Existing approaches don't provide a solution to this problem, and so two different methods for selfie and landscape images may be used. For a selfie. lighting similarity between input and reference can be the criteria considered for selecting candidate. The lighting similarity score may be based on comparing shadow regions between the two images. For this purpose, the face can be divided into four regions, i.e. top/down and left/right. Color segmentation can be applied to these region based on statistical thresholding. The number of masked pixels per region can be used to classify the image in one of the shadow orientations. In a landscape, candidates are selected according to an image retrieval results. A histogram of classes in the segmentation image can be calculated and the reference images is scored according to the distance to that histogram.

In view of the features described herein, the computational time of the mass transport can be decreased up to 360x. Despite the computational cost of combining all the steps, the method can present an interactive UI with limited latency for the user. It can calculate asynchronously the maps generation of input and reference images and precompute the static ones. If the user includes a new input image then the method can calculate its maps while he selects the preferred reference (with a margin of 200 ms). In the case of a new reference the user will have to wait 200 ms. To allow users to interact with existing reference images the method can enable a sketch tool to draw on top of the images. This will just modify the color maps and a recalculation of the segmentation maps will not be needed. The solution may be extended to videos. For instance, for Keyframe 1, scene transfer can be performed; for Frame 2 . . . X, regression can be performed; for Keyframe 2, scene transfer can be performed; for Frame X+2 . . . Y, regression; for Keyframe 3, scene transfer, followed by regression.

The results of the mass transport of the initial frame can be propagated to the consecutive ones. The propagation can be done from key frame to key frame. A scene change detector can be triggered to separate key frames.

As mentioned above, the method can divide execution time in different steps. The execution time can be divided into different steps. These steps can be parallelized, making the app run in interaction time. The solution can accelerate the process to more than 360x (even considering that we added five new maps to the mass transport). The method can provide a real-time on-device color editing tool that produces realistic results. The pipeline can speed up considerably, i.e. 360x, similar state-of-the-art solutions enabling an interactive UI with limited latency for the user. For this purpose, an upscaling algorithm based on linear regression can be used. In addition, the mass transport can be enriched with new maps that incorporate image semantic information. Different color spaces and map's weight could be further investigated to allow the user to have more control on the obtained results.

In some cases in a map generation step (which can include probabilistic segmentation), maps can be extracted from input images. After this, in a candidate proposal step (which can include SoftMax segregation and histogram distance computations), suitable references are automatically selected for the image input. After this in a real-time color transfer step (which can include rescaling, SMART subsampling, Mass transport and regression processes), the maps and the references can be used for color transferring.

In some cases, light conditions from a reference can be transferred to the input. The input image can be received by a portrait geometry and light estimation step, which can involve 3D face geometry, highlight removal, segmentation and shadow analysis processes. Then, intelligent candidates may be selected. Then, portrait light editing may be performed to produce the final output, which can involve rescaling, mass transport and regression processes.

In some cases, one or more of the following techniques may be used: add segmentation maps to the colour transfer transformations; the segmentation may be included in the transformation as logits so that each pixel can have the probability of belonging to many classes (this can reduce hard boundaries in the transformation); acceleration of the process 360x times by subscaling 20x the original input and upscale the mass transport results to the final resolution using a linear regression mode; make input and reference maps calculations asynchronous so the final app can remain interactive; some image retrieval techniques; solutions extended to video (propagating the results of mass transport of the initial frame to the consecutive ones; the propagation can be done from key frame to key frame, and a scene change detector can be triggered to separate key frames); best reference selection an be executed every keyframe). In some cases through use of: 1) a statistical system, the method may be able to create a representation of a given input or reference; 2) an image retrieval system, the method may be able to create/find a representation similar to the given input or reference. The representation may be semantically parable with each of the components representing information about the input. Thus, the method/system can be used to find relatable references, or create new references through the statistical system by manipulating the original input to create a modified version of it that is closer to the desired.

In some cases, an intelligent candidate generation may use a metric. An example of such metrics can involve the input image have a scene recognition process applied to it. A scene simplification technique may then be used, where the image (including inputs such as a candidate line) is processed by a VGG16 network to produce a semantic line. Alternatively, a code vector process (D1, D2, . . . DN) may then be used. Alternatively, segmentation and class distribution histogram processes may then be used. Finally, a K-NN matching process may be used to produce output images.

Advantageous Effects of Invention

Given a style transfer algorithm that requires a reference image, some embodiments can generate an optimal reference image for a particular input image using a statistical system. This can provide better results for a given input image and automatically provide an optimal reference for the input image.

Some embodiments can obtain a statistical representation of a given input image. Some embodiments can create a modified version of that statistical representation that is closer to the style of a selected desired transfer style by applying properties of a selected desired style to the statistical representation of the input image. Some embodiments can then render a new image using the modified statistical representation. The rendered image can be used as a reference image in a style transfer process applied to the input image in order to provide improved results. Thus, instead of directly using a selected style transfer image as a reference image, as is conventional, embodiments can generate/render a synthetic version of the input image and use that as a reference image when a style transfer operation is performed. For instance, when the input image comprises a face, the synthetic rendering can comprise a 3D rendering of the face.

According to the present invention, there is provided a method and apparatus as set forth in the appended claims. Other features of the invention will be apparent form the dependent claims, and the description which follows.

BRIEF DESCRIPTION OF DRAWINGS

For a better understanding of the invention, and to show how embodiments of the same may be carried into effect, reference will now be made, by way of example, to the accompanying diagrammatic drawings in which.

MODE FOR THE INVENTION

Figure 1:
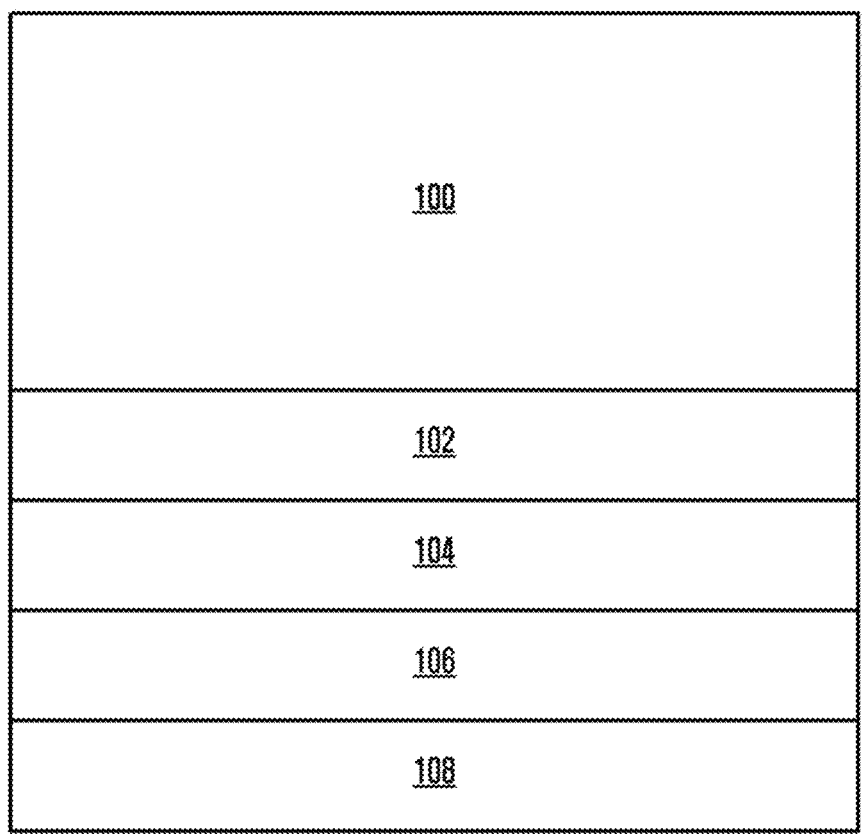
FIG. 1 schematically illustrates an example computing device configured to execute an embodiment.

FIG. 1 is a block diagram of a computing device 100 configurable to execute embodiments of the image manipulation method. The device will normally comprise, or be associated with, at least a processor 102, memory 104, a wireless communication unit 106 and a user interface component 108. Examples of suitable devices include mobile telephones/smartphones, tablet computers and other types of, typically mobile/portable/handheld, computing/communications devices. The user component interface 108 may comprise a touchscreen in some embodiments. Other components and features of the device will be well-known to the skilled person and need not be described herein in detail.

Figure 2:
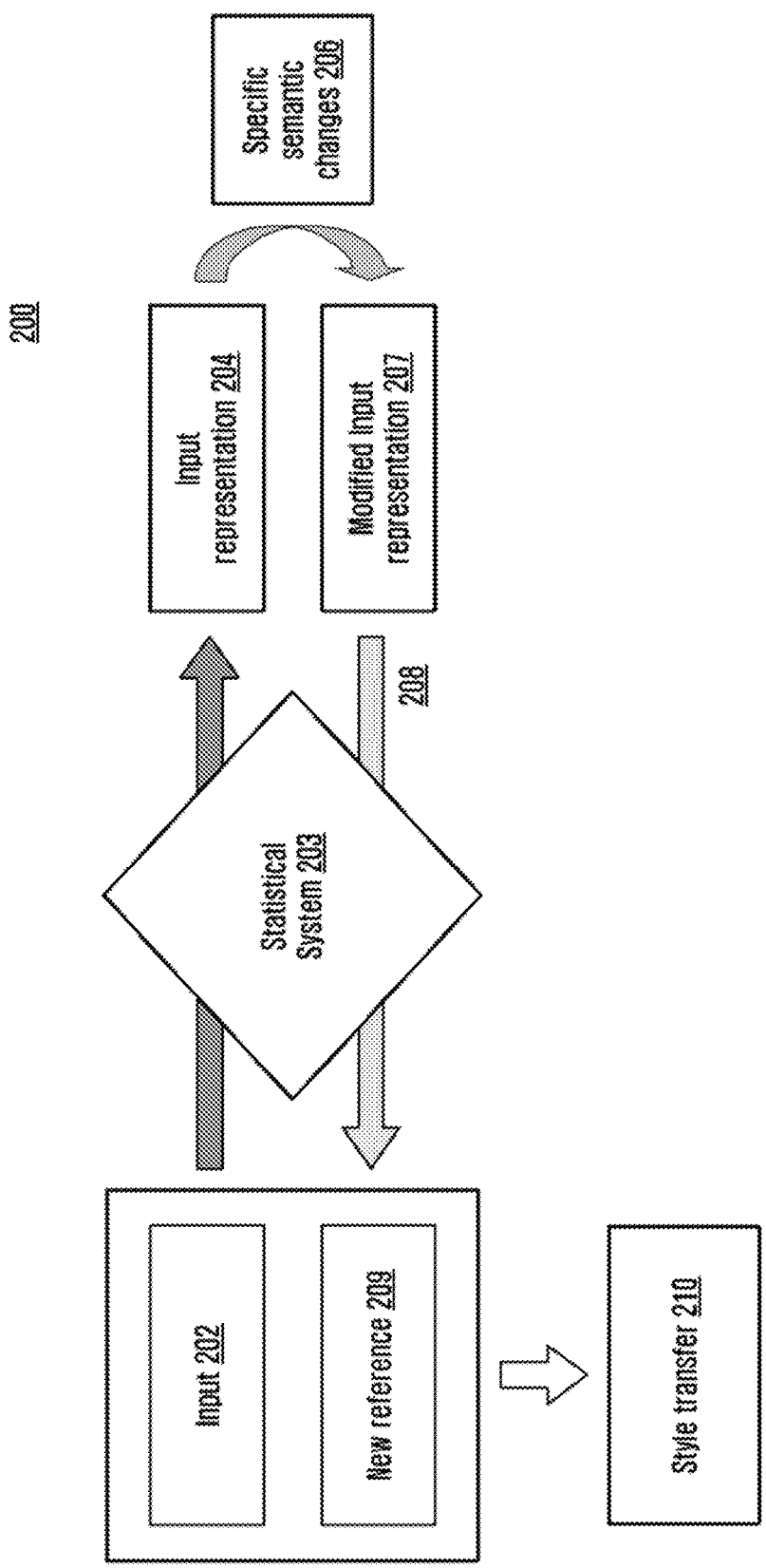
FIG. 2 is a flowchart outlining example steps performed by an embodiment, including generating a reference image for a style transfer operation.

FIG. 2 is a flowchart showing steps of an embodiment of the image manipulation method 200 that can be performed by means of software instructions being executed by the device 100. It will be appreciated that at least some of the steps shown in the Figures herein may be re-ordered or omitted. One or more additional steps may be performed in some cases. Further, although the steps are shown as being performed in sequence in the Figures, in alternative embodiments at least some of them may be performed concurrently. It will also be understood that embodiments can be implemented using any suitable software, programming language, data editors, etc, and may be represented/stored/processed using any suitable data structures and formats.

The method will typically be invoked when there is a need for the device 100 to generate a manipulated image. For instance, a user may cause an application executing on the device 100 to start performing the method 200. The method may be implemented as a feature of a multi-function application (e.g. a photo gallery, image sharing or image editing application), or it may be a stand-alone application. The method may display a user interface on the touchscreen 108 of the device that can prompt the user for input and also display outputs of the method.

At step 202 the user selects an input image that is to be used to generate a manipulated image. The user may select an image from a plurality of stored images. The images may be stored in the memory 104 of the device and/or in at least one other storage location (e.g. an external storage device, such as a removable storage media), or may be accessed over a network connection (e.g. using a Cloud-based service). The input image may be selected in any suitable manner. For example, the user may be presented with thumbnail versions of the plurality of images that can be chosen via the touchscreen 108, or the user may search for a specific image in some other manner, e.g. by using text-based tags, time/date stamps, etc, associated with the images. Alternatively, the user may use a camera application or the like to produce a new input image that is selected for manipulation.

The user can also select a desired transfer style to be applied to the input image at step 202. In some cases the desired transfer style may be based on image features/properties (e.g. lighting properties, colour properties, shadow properties, etc) of an existing image. Each image feature can have an associated value that can be processed so that embodiments may manipulate the input image so that such properties of the desired style are applied to it (so that it gains a similar appearance or visual style to the desired style) whilst preserving original content of the input image.

Figure 5:
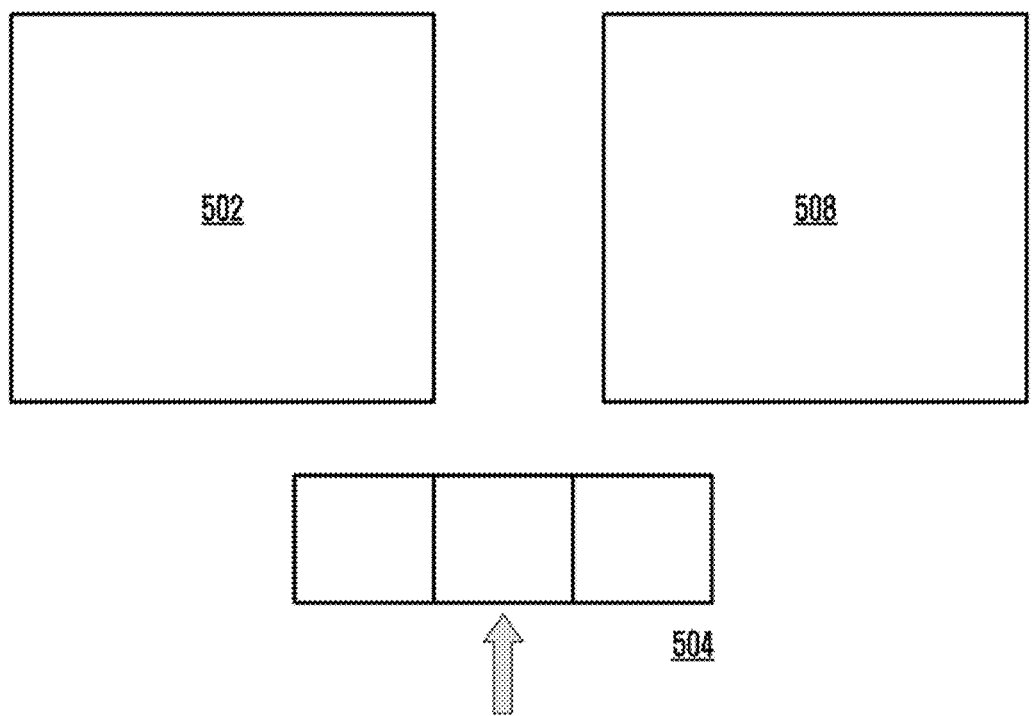
FIG. 5 illustrates an example use case.

FIG. 5 shows an example of the method 200 in use on the device 100, including a user interface that is useable to select a desired style to be transferred to an input image 502. It will be understood that the form and design of the user interface shown herein is exemplary only and many variations are possible.

The user interface can include at least one interactive element 504 (e.g. menu, slider, numerical input box, etc) that can allow the desired style (and, optionally, at least one other parameter used by the method 200) to be selected and/or changed by the user. For example, the interactive element may present the user with a selection of styles that are labelled textually and/or graphically. In one example, the desired styles may comprise a set of different lighting conditions, e.g. conditions representing lighting conditions at different hours/times of the day. Thus, each of the desired styles may comprise data describing preset modifications of the image features, i.e. containing at least one value that can be used to replace a value associated with the image feature in the representation of input image (the input feature vector representation).

In other embodiments the user may select a desired style based on a transfer image that he selects from a plurality of stored style transfer images. Thumbnails of these may be displayed for selection at the user interface item 504. The plurality of images may be of a same/similar type as the input image. In one example the input image 502 comprises a portrait of a human face, which may be a selfie taken by the user, and the style transfer images 504 comprise other portrait images of human faces. The style transfer images may be a subset of a larger library of images that are selected by the method. In some embodiments the style transfer images may be selected as ones having a same/similar type, or category, as the input image. For example, the type of the input image may be identified as a "portrait". The identification of the type of an image may either be done automatically by the method (e.g. using image recognition techniques, including scene classification algorithms, such as CNN, DNN or the like), and/or may involve user input (e.g. the user selects the type of the image from a menu of options). At least some of the images in the library that are associated with data identifying their type as a portrait may then be made available for selection via the user interface in this example.

After the user selects a particular desired style using the interface item 504 an output image 508 is generated. The output image 508 comprises a manipulated version of the input image 502 having a style of the selected desired style applied to it by means of an embodiment of the method described herein.

It will be understood that the method 200 can be used with a different type of image. For example, the input image can comprise a natural landscape and the plurality of selectable style transfer images can comprise images of various types of natural landscapes. Specific examples of style transfer images can be labelled as night, day, water, snow, sunrise and summer. Upon a user selecting a particular style image (and, optionally, setting at least one other parameter), an embodiment can generate an output image comprising a manipulated version of the input landscape image having a style of the selected style image applied to it.

Thus, it will be understood that embodiments are not limited to portraits and landscapes and other types of input images and style transfer images. A non-limiting set of examples of other image types that embodiments can process includes: landscapes, interiors, sporting events, performances, groups, animals, or even various sub-types of these.

Returning to FIG. 2, at step 204 embodiments can obtain data comprising a representation of the input image. The representation may be based on statistical data that has been built for a type/category (e.g. portrait, landscape, etc) of image that corresponds to the type of input image. The building of the representation data may be performed by at least one other computing device prior to the execution of the image manipulation method 200 on the device 100, with resulting data then being made available to the image manipulation method (e.g. transferred to and stored in the memory 104).

To build statistical representation data for a particular type of image, a large number of representative examples of images of that type may be obtained from any suitable source, such as an image library. These images can be analysed using a statistical system being executed on the at least one other computing device that can use a content analysis method to identify common features of the images. For example, for portrait type images, face inverse rendering can be used to identify common image features, such as eyes, nose, lips, etc. For landscape type images, the common features can include particular type of mountains, trees, bodies of water, and so on.

A known example of how to build a statistical representation is described in Li, Tianye et al: "Learning a model of facial shape and expression from 4D scans", ACM Transactions on Graphics, 36(6), 194:1-194:17, 2017 Nov. 20, the contents of which are incorporated herein by reference. That publication gives an example of how to generate a statistical representation/model for face type images that is achieved by learning the principal components of deformations of a face (e.g. shape, pose and expression) based on an acquired 3D face dataset. It will be understood that representation data can be built in a similar manner for different types of images by parameterizing them through specialized image features (e.g. orientation of gradients, manufactured features, physical models, etc). For instance, any suitable method of content analysis, such as oriented gradients, crafted features, edge detection, etc, can be used to identify features of any type of image. Embodiments can use a reversible type of model/method to generate the representation data so that it can also be used to categorize input images and generate reference images (as will be described below).

The system used to build the image type representation data may comprise a machine learning technique that learns the distribution of the identified features across the examples, e.g. by means of a dimensionality reduction process, or the like. Some embodiments use Principal Component Analysis (PCA) for this, but it should be understood that other suitable techniques, such as Disentangled VAEs, Auto-encoders, Sparse coding, etc, can be used. The system can output data describing the main features of the example images and the associated distributions across those features. Thus, the representation data can comprise a set of identified features, and data describing common examples of each of those features found in the example image dataset. A simplified example of the representation data is illustrated in the table 1 below:

TABLE 1

| Image type: Portrait | |
|---|---|
| Identified Features | Values |
| Eye colour | Blue 1, blue 2, green 1, green 2, etc |
| Eye size | EX1 × EY1, EX2 × EY2, etc |
| . . . | . . . |
| Mouth size | MX1 × MY1, MX2 × MY2, etc |
| . . . | . . . |

Once a statistical representation(s) of one or more types of images has/have been built in the above manner, the resulting data can be provided to/accessed by a statistical system 203 that is part of the image manipulation method 200 being executed by the device 100. That statistical system 203 can receive the input image 202 (that is of one of the represented types) and output a statistical representation 204 of it in the relevant feature space of the representations/model (e.g. as a vector of floats). Embodiments can use any method of similarity measurement (such as Nearest Neighbours) to find potential candidates within the representations that are closely related to the input image in terms of visual similarity of features. Thus, embodiments can select the examples of features from the representation data that most closely resemble those of the input image. Embodiments can also measure where any difference lies between that chosen example and the input image.

A simplified example of the statistical representation 204 of a particular input image (of the portrait type and based on the example table 1 above) is illustrated in the table 2 below:

TABLE 2

| Representation of input image (type: portrait) | |
|---|---|
| Feature | Value |
| Eye colour | Blue 2 |
| Eye size | EX2 × EY2 |
| . . . | . . . |
| Mouth size | MX1 × MY1 |
| . . . | . . . |

In some embodiments the representation of the input image may comprise a vector of numbers that represents where the input image lies in the distribution of features extracted by the statistical system. In the example where the statistical system is based on face features (e.g. eyes, lips, etc) the features can be directly linked to the 3D face of the user present in the picture. In other cases, this can be based on different features (e.g. lighting conditions, general mood of subject, etc) that do not link directly to 3D features. Additional information can be gathered through the statistical representation of the image and this may be done automatically as the input image is selected. This can also be done prior to that, e.g. as the image is saved in a gallery. The statistical representation of the input can be a vector of floats that is much smaller in size than the image and so can be stored with minimal cost in terms of memory.

Figure 3:
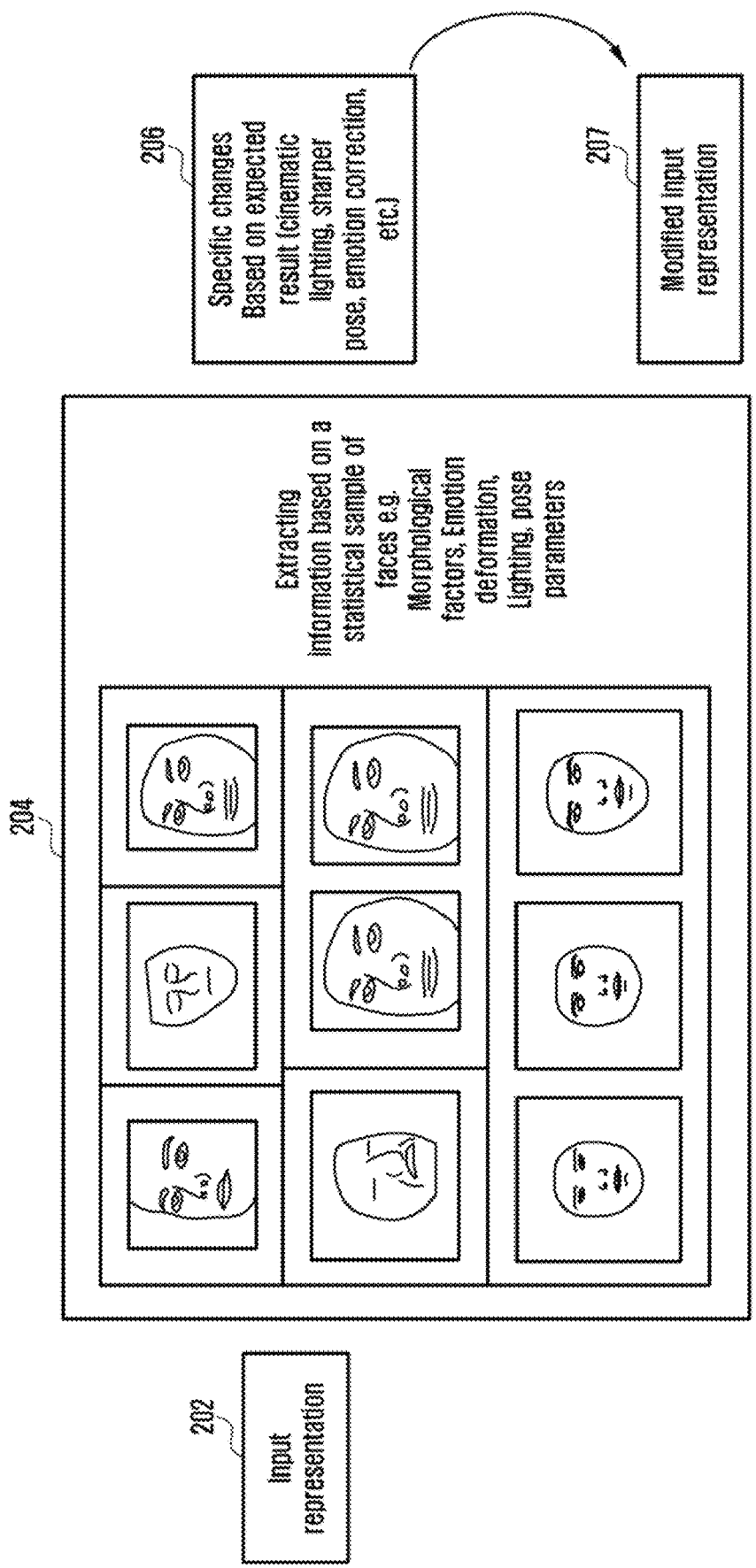
FIG. 3 is a flowchart further showing steps involved in generating the reference image.

FIG. 3 schematically illustrates examples of items 202, 204, 206 and 207 of FIG. 2 for a face/portrait type input image. Features (e.g. morphological factors, emotion deformation, lighting, skin parameters, pose parameters) that were identified in the image type representation data based on a statistical sample of portraits/faces are identified in the input image. Values describing these identified features are then extracted to obtain the input image representation. Specific modifications based on the expected result (e.g. cinematic lighting, sharper pose, emotion correction, etc.) can then be made to at least some of these values.

Figure 4:
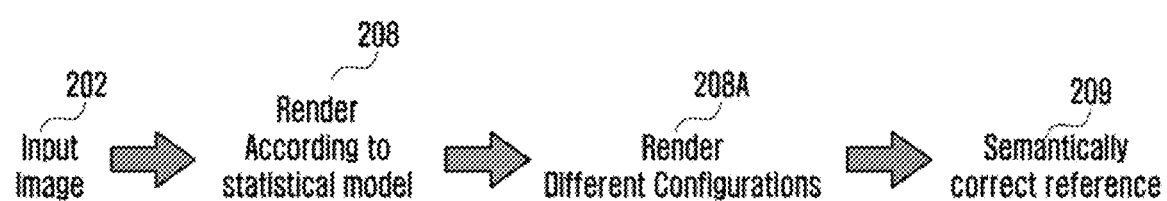
FIG. 4 illustrates an example reference image being generated.

FIG. 4 illustrates an example of using a statistical system, such as face inverse rendering techniques where face properties, such as light, are determined from an input image. These values are modified in order to create a suitable reference image given a transfer style input (e.g. keep identity and morphology while changing the lighting and emotions). Typically, the method will render one reference image based on the selected configurations/settings, although it is possible to generate more than one, based on different configurations/settings (e.g. step 208A), in some cases, at least one of which can then be selected by the user for further processing.

Thus, the statistical system used to build and process the representation data can be composed of a machine learning system that learns the distribution of the selected/identified features across examples (done before execution of the image manipulation method 200), and a generative model that the image manipulation method 200 can use to obtain a representation of the input image 202 and render a reference image based on it (this can be the same system in face/portrait type image embodiments at least).

Returning to FIG. 2, at step 206 embodiments can modify the obtained statistical representation of the input image so that it is closer to the input image and/or the style transfer image selected at the step 202. For instance, if the value of the feature "eye colour" in the obtained representation of the input image is "Blue2" and the value of the corresponding feature in the input image (or the desired style) is "Blue1" then the value of the feature "eye colour" in the modified statistical representation may be modified to "Blue1". Embodiments may also edit intrinsic features of the representations of the image, such as light properties, for example. This can allow embodiments to subsequently render a synthetic image of the person with the different light conditions, for instance, and use that as a reference image.

A simplified example of a modified statistical representation 207 of the input image (of the portrait type and based on the example table 2 above) is illustrated in the table 3 below:

TABLE 3

Modified representation of input image (type: portrait)

| Feature | Modified value |
| --- | --- |
| Eye colour | Blue 1 (modified −1) |
| Eye size | EX2 × EY2 (unmodified) |
| . . . | . . . |
| Mouth size | MX2 × MY2 (modified) |
| . . . | . . . |

The modified representation 207 output by step 206 can comprise a vector of floats that represents where the input image fits on the learned representation of the features. These numbers can then be tweaked manually (e.g. by means of user interface items) if they differ too much from the expected result.

At step 208 embodiments can use the modified input representation to render a reference image 209. The rendering may comprise a reverse of the process used to generate the statistical representation of the image. An example of a reversible process suitable for portrait types images is face rendering, which can result in a 3D rendered synthetic version of the photographed face in the input image 202. Embodiments may involve differential rendering in a machine learning framework.

At step 210 embodiments can use the reference image 209 to perform a style transfer operation on the input image. Examples of suitable style transfer operations that can use the input image and rendered reference image as inputs include GANs, Generative Models, or Histogram Transfer, but it will be understood that other techniques may be used. For instance, some embodiments may use trained neural networks to perform the style transfer operation. Following the completion of the style transfer step 210 a user may perform a further action using the manipulated image, e.g. select it for storage or sharing using a menu, for example.

Figure 6:
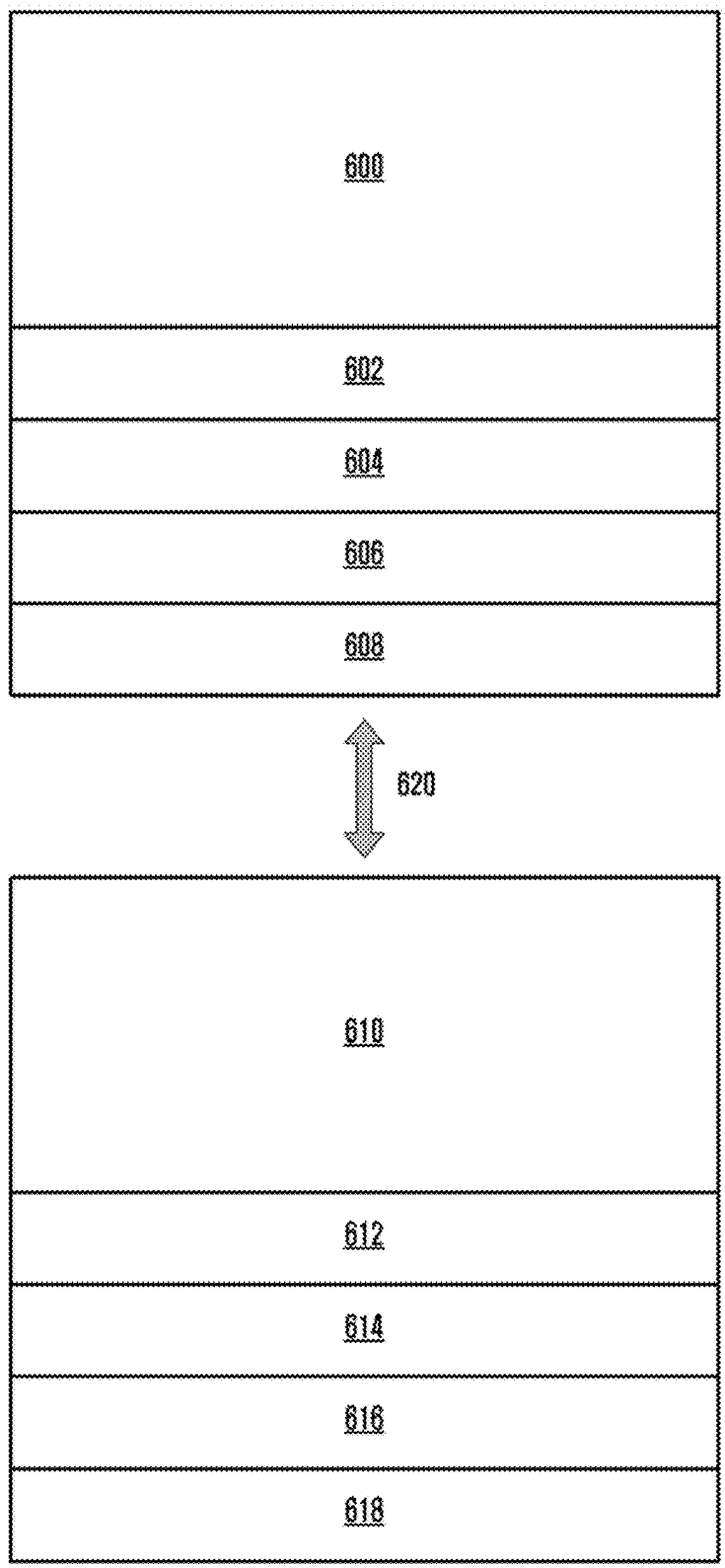
FIG. 6 schematically illustrates an example computing device configured to execute another embodiment.

FIG. 6 is a block diagram showing a first computing device 600 and a second computing device 610 that are configurable to execute embodiments of the image manipulation method. It will be understood that features of this embodiment can be used in conjunction with other embodiments, or they may be used independently. The first computing device will normally comprise a user device, e.g. a mobile telephone/smartphone, tablet computer or another type of, typically mobile/portable/handheld, computing/communications device. The user device will include, or be associated with, at least a processor 602, memory 604, a wireless communication unit 606 and a user interface component 608. The user component interface 608 may comprise a touchscreen in some embodiments. Other components and features of the device will be well-known to the skilled person and need not be described herein in detail.

The second computing device 610 may comprise a server computing device and may be operated by a service provider entity. The server will also include, or be associated with, at least a processor 612, memory 614 and a wireless communication unit 616, as well as other well-known components and features, such as a user interface 618. The user device 600 and the server can communicate via any suitable communications network 620, which can include the internet, a cellular/wireless network, etc.

Figure 7A:
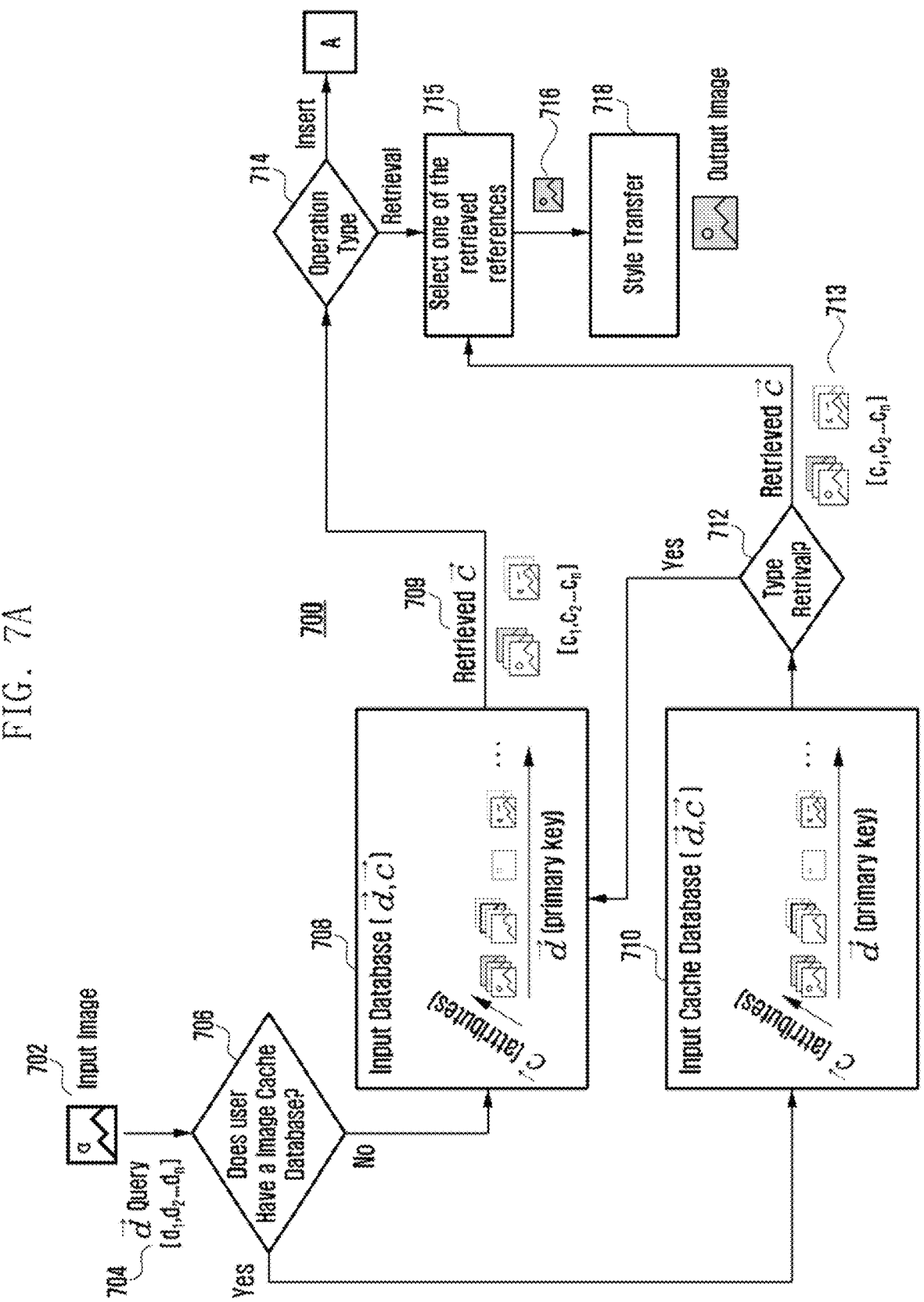
FIGS. 7A-7B are flowcharts showing example steps performed by the embodiment of FIG. 6.
Figure 7B:
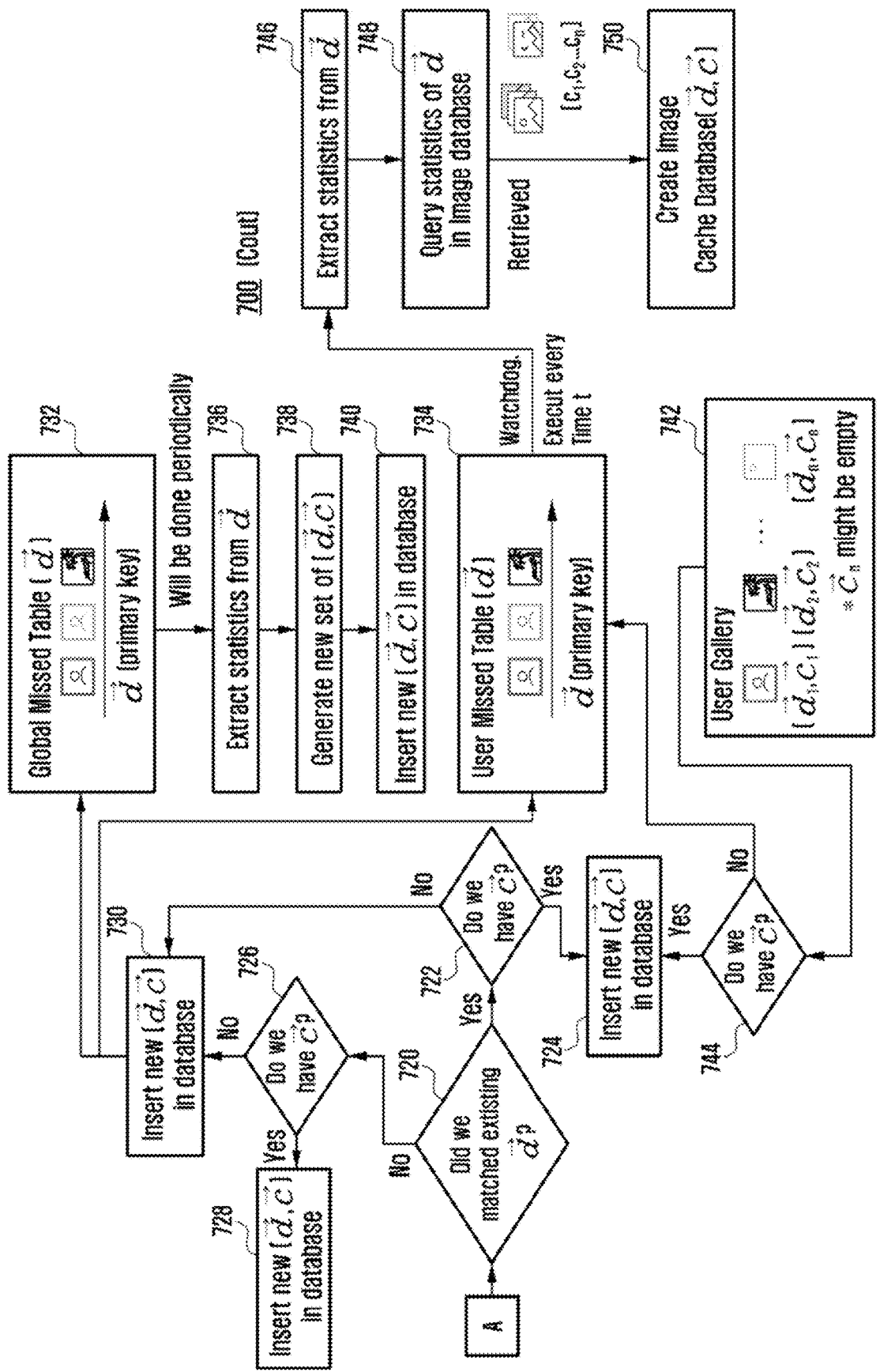

FIGS. 7A-7B are flowcharts showing steps of an embodiment of an image manipulation method 700 that can be performed by means of software instructions being executed on the user device 600 and/or the server 610. A developer may make a design choice regarding whether software executed on the user device or the server is used to perform certain steps.

The method 700 will typically be invoked when there is a need for the user device 600 to generate a manipulated image. For instance, a user of the device may cause an application executing on the device 600 to start performing the method 700. The method may be implemented as a feature of a multi-function application (e.g. a photo gallery, image sharing or image editing application), or it may be a stand-alone application. The method may display a user interface on the touchscreen of the user device that can prompt the user for input and also display outputs of the method.

An example use case of the method 700 will now be given for explanatory purposes. In this example the user provides an input image that comprises a natural landscape. The method can obtain a set of image content descriptors for the input image. The image content descriptors may comprise numerical values. For example, an image content descriptor may indicate the percentage of pixels in the image that represents a certain type of content, such as a natural landscape or portrait. Additionally or alternatively, the image content descriptors may comprise counters, such as: the image contains N number of certain features, e.g. persons or animals. Additionally or alternatively, the image content descriptors may comprise binary values, e.g. the image contains a certain feature (e.g. person or seascape): 1/0. The method can then access a data store containing data relating to groups of stored images. Based on the image content descriptors of the input image and image content descriptors of the stored images held in the data store the method can find a group of stored images that comprises a similar natural landscape (e.g. image content descriptors for the input and stored images in the group indicate that the images both comprise over 90% natural landscape).

In one example, one group is found that comprises a first stored image showing its landscape captured in autumn and a second stored image showing its landscape captured in winter. The user can then be presented with data describing the image capture characteristics of the stored images in the found group. For instance, the method may display thumbnail versions of the first and second stored images and/or text describing the capture characteristics of the images, e.g. "autumn" and "winter". The user can then select one of these and the corresponding stored image is then retrieved. For example, if the user selects the "autumn" capture characteristics then the first stored image is retrieved. That retrieved stored image is then used as a reference image for a style transfer process applied to the user's input image. Thus, an output image is generated that is a modified version of the user's input image (which may have been captured in summer, for example) that has characteristics of the autumnal stored image (e.g. a more red/orange colour pallet) applied to it to give a different visual effect that is desired by the user (e.g. to give the impression that the input photograph was captured in the autumn season). As the method aims to ensure that the retrieved stored image used as the reference image is similar to the input image, the output image will be of good quality.

It will be understood that the above use case is exemplary only and many variations are possible. For instance, embodiments are not limited to landscapes and other types of input images and style transfer images can be used. A non-limiting set of examples of other image types that embodiments can process includes: portraits, interiors, sporting events, performances, groups, animals, or even various sub-types of these. Further, the style transfer may involve transferring any image capture characteristic (e.g. lighting properties, colour properties, shadow properties, etc) of the retrieved stored image to the input image so that it gains a similar appearance or visual style to the reference image whilst preserving original content of the input image.

Referring to FIG. 7A, at step 702 the user of the device 600 provides an input image that is to be used to generate a manipulated image. In some cases the user may select an image from a plurality of stored images. The images may be stored in the memory 604 of the user device 600 and/or in at least one other storage location (e.g. an external storage device, such as a removable storage media), or may be accessed over a network connection (e.g. using a Cloud-based service). The input image may be selected in any suitable manner. For example, the user may be presented with thumbnail versions of the plurality of images that can be chosen via the user interface, or the user may search for a specific image in some other manner, e.g. by using text-based tags, time/date stamps, etc, associated with the images. Alternatively, the user may use a camera application or device to produce a new input image for the method.

Figure 8:
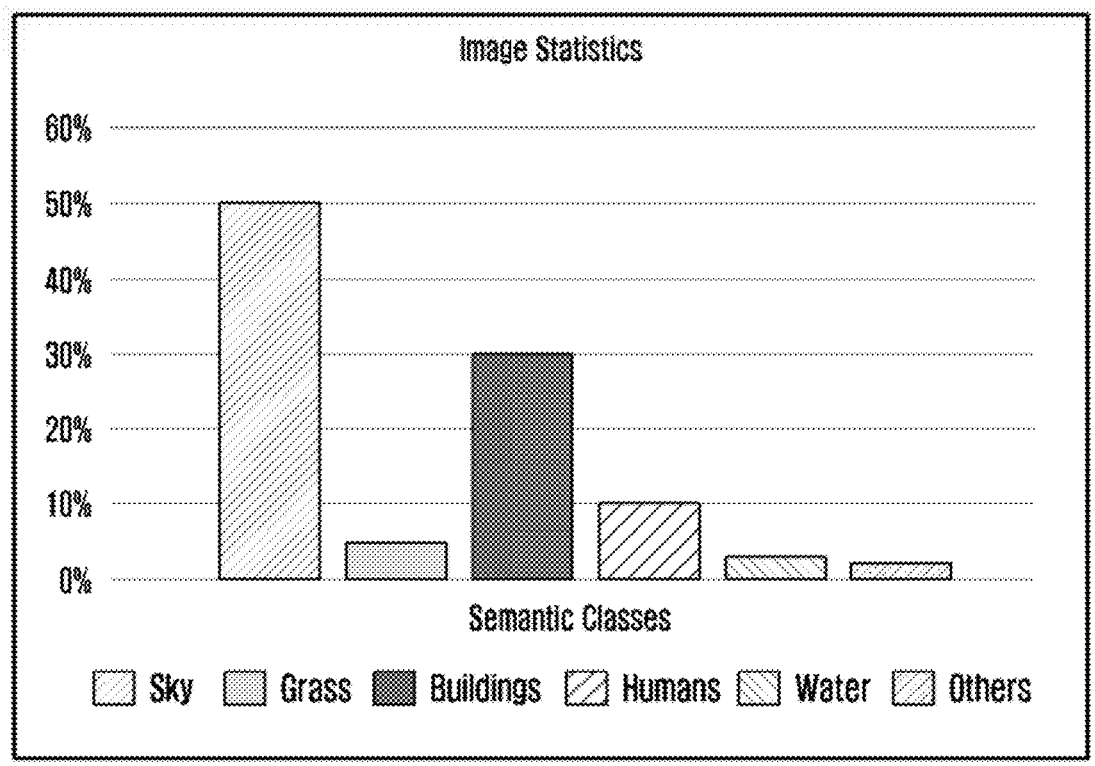
FIG. 8 is a chart illustrating an example of semantic classes in an example image that can be determined by an embodiment.

At step 704 embodiments of the method 700 can obtain a set of image content descriptors for the input image. The image content descriptors can comprise a set of interpretable features that describe the content of an image (typically only to a partial extent). In order words, the image content descriptors can have semantic meaning. For instance, an image content descriptor may refer to a known class (e.g. landscape, office, room, portrait, etc) of image. Alternatively or additionally, an image content descriptor may describe the content of an image by means of a histogram of classes of content in an image (e.g. 80% sky, 20% grass). FIG. 8 graphically illustrates the mean histogram of example classes in an example image. Alternatively or additionally, an image content descriptor may comprise semantic embedding extracted from a Neural Network (for example, ones be formed using a variational auto-encoder). Some embodiments may process a vector $\vec{d}$ of these image content descriptors.

The image content descriptors for the input image may be generated manually by a user (e.g. by inputting keywords that describe the features/content of an image), and/or may be generated in an automated manner, e.g. using a machine learning technique. Examples include a content analysis method, an image recognition method (including scene classification algorithms, such as CNN, DNN, etc) or the like. Such an automated technique can output data describing the main features/content of the image and, in some case, the associated distributions of those features in relation to other images.

In embodiments the method 700 can aim to find a group of stored images that are similar to the input image. Typically, the group of found stored images comprise different versions of the same (or substantially similar) stored image with different image capture characteristics. One of these can then be selected to retrieve a reference image that is used to perform a style transfer operation on the input image.

For the purpose of finding stored images similar to the input image at least one data store can be accessed by the method 700. The data store contains data relating to a plurality of existing/stored images. The stored images themselves may be stored in the same data store or in a different data store. That is, the data used by embodiments may be stored in more than one database, device and/or location. It should also be understood that the data store(s) can have any suitable structure, format, contents, etc, and need not comprise databases/tables exactly as described for the detailed examples herein.

In embodiments the stored images (and/or related data) can be at least logically arranged in a plurality of groups. Typically, the stored images in one group may all be substantially the same/similar image, but with different image capture characteristics. For example, the group may comprise versions of substantially the same image captured at different times of day, different seasons of the year, using different illumination colours, and so on. The stored images in one group may be associated with a set of image content descriptors. Again, these image content descriptors can comprise a set of interpretable features that describe the content of the image and can have semantic meaning, e.g. may refer to a known class (e.g. landscape, office, room, portrait, etc) of image, etc. These image content descriptors (which may be represented by vector $\vec{d}$ in some embodiments) will typically be generated in the same manner as the image content descriptors for the input image discussed above.

Each of the stored images in the group can also have an associated set of descriptors for its image capture characteristics, which are also contained in the data store. An image capture characteristics descriptor may comprise an abstract representation of language. The image capture characteristics descriptors may be generated manually by a user (e.g. by inputting keywords that describe the capture characteristics of the image), and/or may be generated in an automated manner. The automated technique may be based on a content analysis method, an image recognition method or the like (which may comprise machine learning techniques) and/or may be extracted from image processing algorithms or from the metadata of the image. For instance, the image processing may comprise colour analysis, e.g. monotone, high contrast, colourful, etc. The metadata can be used to extract information such as location, date/time, the camera mode used to capture the image (e.g. sunny, cloudy, night, etc), for instance. Some embodiments may process a vector $\vec{c}$ of these image capture characteristic descriptors. In some embodiments the data store may comprise a table ($\vec{d}$, $\vec{c}$) that contains $\vec{d}$, $\vec{c}$, where $\vec{d}$ defines a composed primary key and $\vec{c}$ is a list of Boolean attributes for each of the possible configurations of the images in a particular group that is known in the data store.

At step 706 embodiments may select a data store from a plurality of possible data stores that is to be used to find a group of stored images similar to the input image. It is clearly not practical to have all possible images (captured using all possible image capture characteristics) included in a data store and so embodiments aim to reduce the amount of stored data required by analysing statistics relating to demands/activities of at least one user in relation to images, and using these statistics to generate the at least one data store. At an initial stage data relating to a subset of all images processed by the system can be contained in the data store. When at least one user starts using the system it will be possible to capture statistics of the images he captures, uses or stores (e.g. in a user gallery on the user's device) and use this information to select which image data should be stored. Examples of this type information will be discussed further below.

Additionally, in order to avoid/reduce network data transfer between the user device 600 and the remote server 610 over the communications network 620 it can be beneficial for embodiments to only access a data store that is local to the user device, e.g. a data store contained in the memory 604 of the user device. Alternatively, the local data store may be located on a near node/device that can be accessed by an alternative type of connection (such as Bluetooth™, Wifi™, etc) that has advantages, such as reliability, cost, speed, etc, over the communications network 620. For this reason, it is advantageous for the local data store to contain data relating to a more limited number of images that are most likely to be relevant to the user's needs in relation to image manipulation. Details regarding how embodiments can achieve these aims will be given below in relation to creation of the global and local data stores. In some embodiments the local data store may comprise a table ($\vec{d}$, $\vec{c}$) that is a subset of the remote data store and has been defined using information regarding user demands and content.

Returning to step 706, if a check performed by the method 700 (e.g. executing on the user device 600) indicates that the user device 600 does not contain a local data store/cache that can be accessed by the method 700 then control passes to step 708, where the method accesses a remote data store (e.g. on the server device 610) via the communications network 620. The set of image content descriptors obtained for the input image may be presented as a query to the data store/database.

At step 708 the method 700 can use the remote data store to search for at least one group of stored images that are similar to the input image, e.g. similar in terms of image content descriptor(s), d. Some embodiments use Euclidean or Cosine distance to determine the closest image(s) described by d in the remote data store/table, although alternative techniques may be used, e.g. decision trees (classification trees or boosted trees), random forest, support vector machines or other type of classifier. Some embodiments may set a predetermined distance threshold, e.g. 10, to ensure to a big enough list of image capture characteristics (c's) is returned. Ideally, the distance would be 0, where the system would theoretically contain examples of all possible input images and so could always find a perfect reference image. However, as this is unfeasible, the distance may be tuned according to the number of stored images referenced by the data store and the descriptors used. For example, if an image content descriptor comprises a semantic percentage then an embodiment may determine that two images are sufficiently similar if their contents differ by less than 10%.

To give a simple example to illustrate, the following three image content descriptors may be obtained for the input image at step 704: % natural landscape (numerical value), contains lake (binary value), and contains mountain (binary value). These can be compared with the corresponding image descriptors for stored image groups, as illustrated in the table 4 below:

TABLE 4

| | Input image | Stored image group d1 | Stored image group d2 |
|---|---|---|---|
| Image content descriptor (numerical): % natural landscape | 95% | 98% | 97% |
| Image content descriptor (binary): contains lake | 1 | 1 | 1 |
| Image content descriptor (binary): contains mountain | 1 | 1 | 0 |

In the above example case, the stored image group d2 may be found as the closest found image group to the input image.

At step 709 the method 700 can retrieve image capture characteristics (c's) relating to existing stored images that look very similar to the input image (i.e. ones close in the d space) and which were found at the step 708. The user will later be able to select his preferred image capture characteristics (c) from the list of all these known configurations/image capture characteristics (c's), e.g. after data representing c is transferred back to the user device 600.

Returning to step 706, if the check performed by the method 700 indicates that the user device 600 does contain a local data store/cache that can be accessed by the method then control passes to step 710, where the method accesses a local data store. At the step 710 the method (e.g. executing on the user device 600) can use the local data store to search for at least one group of stored images that are similar to the input image in terms of image content descriptor(s), d. Typically, this will be done in a similar manner to the finding operation performed on the remote data store at the step 708, e.g. use Euclidean or Cosine distance to determine which are the closest image described by d in the local data store/table. However, when accessing the local data store the method might search for data relating to stored images that are at a lower predetermined distance threshold, e.g. 1, because the local data store will contain data relating to a smaller selection/spectrum of stored images than the remote data store.

At step 712 the method checks whether an empty retrieval occurred at the step 710. This may happen if there is no stored image having a distance lower than the predetermined threshold (e.g. 1) at the step 710, in which case the method may inform the user of the situation and terminate or request further input. If empty retrieval has occurred then control can pass to the step 708, where the method (e.g. executing on the user device 600) accesses/connects to the remote data store and searches for data relating to similar images after failing to find any in the local data store.

If empty retrieval did not occur then control passes to step 713, where the method 700 can retrieve from the local data store image capture characteristics (c's) associated with the existing stored images that look very similar to the input image to later provide a list of all these possible configurations/image capture characteristics (c's).

Following step 709 or step 713, control can pass to step 714. At the step 714 the method 700 may determine whether data relating to the retrieved set of image capture characteristics (c's) is to be used for insertion into a data store, and/or for retrieving a reference image for a style transfer operation. This determination may be made based on an indication included in the query/instruction relating to the input image so that the same starting point can be used for both types of operations. For example, the user may provide input indicating how the input image is to be used, or an application including the method 700 may provide a user setting for indicating that all, or only certain types of, new images captured by the user device's camera or downloaded by the user's device, etc, may be submitted for insertion in the local and/or remote data store, and so on.

If the method 700 is to retrieve a reference image for the style transfer operation then at step 715 the method 700 can present to the user the retrieved set of image capture characteristics (c's) so that he can make a selection from amongst them. For example, if the user provides input image d1 then the method may retrieve the image capture characteristics relating to at least one group of stored images that is/are very close in the d space. If the method finds two groups of stored images d2 and d3 that are very close to d1 in the d space and the user selects the set of image capture characteristics (c's) associated with the stored image d2 then that stored image d2 will be retrieved at step 716 and used for the style transfer operation. In the event that only one group of stored images is found at step 709 (or step 713) then an automatic selection of the image capture characteristics of that group may be made, or the user may be asked to confirm the selection of that set of image capture characteristics.

At step 718 embodiments can use the image retrieved at step 716 as a reference image for performing a style transfer operation on the input image. Examples of suitable style transfer operations that can use the input image and reference image as inputs include GANs, Generative Models, or Histogram Transfer, but it will be understood that other techniques may be used. For instance, some embodiments may use trained neural networks to perform the style transfer operation. Thus, the output image comprises a manipulated version of the input image having a style of the retrieved stored image applied to it by means of an embodiment of the method described herein. Following the completion of the style transfer operation a user may perform a further action using the manipulated image, e.g. select it for storage, display or sharing using a menu, for example.

Returning to the step 714, if the method 700 determines that data relating to the retrieved set of image capture characteristics (c's) is to be used for insertion into a data store then control passes to step 720 of FIG. 7B. At the step 720, the method checks whether a stored image (d) found at the step 708 or the step 710 was a perfect/very close match to the input image. Finding a stored image (d) does not always mean that the method was able to find a perfect match for the input image; rather, it means that the input image was close to the found stored image. A new entry d, c will be added to the remote data store if:

The input image is within a predetermined distance of the closest stored image/group (d) in the data store—see steps 720 to 722 to 724, or The input image is very close to a known stored image/group (d), but the data store does not contain the specified combination of retrieved image capture characteristic descriptors (c) for that stored image/group (d)—see steps 720 to 726 to 728.

The distances used for these determinations may be selected/tuned according to various factors, e.g. the number of stored images referenced by the data store and the descriptors used. For example, if the input shares less than 10% of its semantic content with one of the stored images then it may be determined that the data store does not contain any sufficiently close stored image in terms of d space.

If the method is unable to add the new d, c to the data store (following steps 720 to 726, or following steps 720 to 722) then at step 730 the image content descriptors (obtained at the step 704) for the input image are added to at least one data store comprising indications of missing image-related data. In the illustrated example there is such a missing image-related data store 732 associated with the remote data store, and another such missing image-related data store 734 associated with the local data store. For example, embodiments may add data to the remote data store if already connected to it. If there is no existing connection then embodiments may add to the local data store and may later (e.g. periodically or when a connection is set up for searching the remote data store, for instance) copy or transfer the data to the remote data store. Periodically (and/or on demand, and/or on an event-driven basis), embodiments may analyse the missing image data store(s) 732, 734 to determine what new stored image-related data would be beneficial to add to the remote data store and/or the local data store.

With regards to the missing image-related data store 732 associated with the remote data store, at step 736 an embodiment may extract statistics from that missing data store 732. In some embodiments the missing image data store 732 can take the form of a "global missed table" that comprises the image content descriptors (d) obtained (at the step 704) for one or more input image for which the system was unable to find a sufficiently similar existing stored image. This data store may optionally contain additional information. For instance, in some embodiments it may contain a counter so that the store can comprise a set of image content descriptor (d's) and a counter that sums up every time that a sufficiently close d vector was not found in the remote data store.

The analysis/extraction/generation of the statistics at the step 736 will be intended to help identify new images (e.g. photos) that meet likely future user demands so that information relating to such images can be added to the remote data store. These new images can also be stored and made available to embodiments so that they can be used as reference images when needed by a user. The new images may be found/generated by a human administrator user or may be done algorithmically. For example, an administrator may review the information in the missing image related data store 732 and determine the appropriate semantic classes and then determine what type(s) of stored image-related information should be added to the remote data store. The missing image related data store 732 will also be updated (e.g. relevant entry deleted) when the new image data has been created and added.

The statistical analysis performed at the step 736 may be intended to avoid generating a new sample for each d entry in the data store 732. The statistical analysis performed at the step 736 may involve various techniques, such as finding an average image of some or all of the images represented in the data store 732. For example, for entries d1 and d2 (each being an image content descriptor indicating the percentage of the image that comprises water, natural landscape and artificial landscape) in the data store 732, an average image $d_{summary}$ may be computed as follows:

d1=0% water, 10% nature, 90% artificial
d2=5% water, 15% nature, 80% artificial
$d_{summary}$: 2.5% water, 12.5% nature, 85% artificial Some embodiments may look at N centroids of the data distribution in the missing data store 732. It can be the mean of all data or sub-clusters of it, depending of the distance between d's stored in the missing image related data store 732. N may be a manually tuned value. For example, given a list of 200 images, it may not be feasible to produce data store entries for future searches for all of these. If the average is computed then precision may be lost because a single example would be generated from 200 inputs. Embodiments may be intended to try to represent the 200 inputs in a better way without needing to generate new samples for each of them. Thus, N clusters may be defined in order to work with N centroids instead of 200 or 1. There are many metrics that will determine how many clusters will be used in this clustering method, e.g. how many administrator users may be available for the task of manually generating samples, the possibility of analysing the standard deviation of the d contained in the missing image related data store and selecting an N proportionally. It will be understood that alternatives to finding an average may be used by other embodiments, e.g. finding the mode, the mean, finding N-clusters in these and keeping the centroids, and so on. Any method used here will have the same intention, i.e. to find missing points in the d data store so that these can be covered based on statistics of usage.

At step 738 embodiments may generate a new set d, c based on the analysis of the step 736. This will typically involve creating an image having the desired image content descriptors (e.g. as indicated by $d_{summary}$). This may be done manually by a photographer or artist, for example, using the desired image content descriptors as guidelines. The capture characteristics of the new image can then be analysed to generate a set of image capture characteristic descriptors (c) to be associated with that image. This may be done by manual labelling when generating/capturing the new image. Additionally or alternatively, the metadata of the new image may be analysed to generate the capture characteristic descriptors, which may include, for example, time of the day or even the camera mode that was used to capture the picture (sunny, cloudy, night . . . ), and so on. Image analysis techniques, such as colour analysis may be used. In some cases it may be possible to synthetically generate this image instead of having a photographer capture it. For instance, a realistic 3D renderer or a GAN can be used to generate scenes that match the desired d's and automatically set possible c's.

At step 740 the new set of image content descriptors (d) and image capture characteristic descriptors (c) generated at the step 738 can be added to the remote data store.

Some embodiments may also access a local image data store 742 (e.g. a user gallery) on the user's device 600 in order to determine what new stored image-related data would be beneficial to add to the remote data store and/or the local data store. Embodiments may obtain and create image content descriptors (d) and image capture characteristic descriptors (c) whenever an image is added to the user gallery, or may seek user input/permission to confirm that this should be done. At step 744, embodiments can check if c is available for the image being processed. Depending on the application, c might not be available from the user gallery. It might be available if c is fully generated using metadata or can be estimated from image content. However, for some applications the information might not be available. If the c is available then control can pass to the step 724 (where d, c is added to the local and/or the remote data store); otherwise the image content descriptors (d) of the image are added to the missing image-related data store 734 associated with the local data store.

With regards to the missing image-related data store 734 associated with the local data store, at step 746 an embodiment may extract statistics from that missing image related data store 734. In some embodiments the missing image related data store 734 can take the form of a "local missed table" that comprises the image content descriptors (d) obtained for one or more input image for which the system was unable to find a sufficiently similar existing stored image. This data store may optionally contain additional information, e.g. a counter.

The extraction/generation of the statistics at the step 746 may be similar to the process performed at the step 736, but is done in relation to the local missed data store 734 rather than the missing image-related data store 732 that is associated with the remote data store. Again, the intention is to help identify new images that meet likely future user demands so that information relating to such images can be added to data stores. In some cases, the operations related to the data store 734 may be intended to update only the local data store that is associated with a particular user of the user device, rather than to update the remote data store, the contents of which may be shared with other users.

At step 748 embodiments may generate a new set d, c based on the analysis of the step 746. The remote data store will be updated over time and embodiments can use it to update the local data store accordingly. Embodiments can retrieve d, c from the remote data store so that the user can have quick access (with little/no latency and bandwidth free) to the local data store that has been shaped to his predicted image-related preferences in relation to style transfer operations. At step 750 the new set of d, c generated can be added to the local data store.

With the addition of multiple users of the system some embodiments can obtain statistics relating to the multiple users' demands. For example:

80% of the users try to retrieve images of flowers.

Or, this is the mean histogram of classes in an image

The server 610 may connect with multiple user devices and collect and process image-related data as discussed above from each of the devices. The data can be generally treated in the same way as done in the case of a single user of the user device 600. This data can be combined/used to update the remote data store and/or the local data store associated with each user/device. Information regarding the users of the multiple devices may be collected and used to determine groups of users whose data can be used together.

It is understood that according to an exemplary embodiment, a computer readable medium storing a computer program to operate a method according to the foregoing embodiments is provided.

Attention is directed to any papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination (for example, a feature of the embodiments of FIGS. 1-5 may be combined with, added to, or replace, a feature of the embodiments of FIGS. 6-8), except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer-implemented image manipulation method comprising:
   receiving an input image;
   receiving a desired style to be transferred to the input image;
   obtaining a representation of the input image selected from a plurality of stored representations of a plurality of images, wherein each of the plurality of stored representations comprises data describing a set of image features;
   modifying at least one of the set of image features in the obtained representation to correspond to the input image and/or the desired style to produce a modified representation;
   rendering a reference image based on the modified representation, and
   generating a manipulated image by performing a style transfer operation on the input image using the reference image,
   wherein the method further comprises:
   determining a set of desired image content descriptors of an image to meet user demands;
   generating a new image having the set of desired image content descriptors;
   obtaining a set of image capture characteristic descriptors of the new image; and
   adding the set of desired image content descriptors and the set of image capture characteristic descriptors obtained for the new image to a data store.

2. The method of claim 1, wherein the plurality of representations comprise a respective plurality of statistical representations, and wherein the image features of the statistical representations comprise common features of the plurality of images identified by a content analysis method performed on the plurality of images.

3. The method of claim 2, wherein the content analysis method is performed by a statistical system to generate the statistical representations of the plurality of images.

4. The method of claim 3, wherein the statistical system comprises a machine learning technique that learns a distribution of the identified common features across the plurality of images.

5. The method of claim 4, wherein the machine learning technique comprises a dimensionality reduction process.

6. The method of claim 3, wherein the of rendering the reference image comprises a reverse of a process used to generate the statistical representations of the plurality of images.

7. The method of claim 6, wherein the reference image comprises a synthetic rendering of the input image.

8. The method of claim 7, wherein the input image comprises a face and the synthetic rendering comprises a 3D rendering of the face.

9. The method of claim 2, wherein the plurality of images comprise a dataset of example images of a particular type, and the set of image features comprise principal features that change across the plurality of images in the dataset.

10. The method of claim 1, wherein the of obtaining the representation of the input image comprises finding a said representation amongst the plurality of stored representations that has a greatest visual similarity to the input image.

11. The method of claim 1, wherein:
    each of the image features of the obtained representation has an associated value describing a property of the image feature;
    the desired style comprises a set of image features, and each of the image features of the desired style has the associated value, and
    wherein the modifying the at least one of the set of image features in the obtained representation comprise modifying the value of the image feature of the obtained representation to correspond to a value of a corresponding the image feature in the input image and/or the desired style.

12. The method of claim 11, wherein the desired style is based on a style image that provides the value for each of the image features of the desired style.

13. The method of claim 1, further comprising:
obtaining the set of image content descriptors for the input image;
accessing a data store related to a plurality of stored images, the data store comprising a set of image content descriptors related to each of the plurality of stored images and the set of image capture characteristic descriptors related to each of the plurality of stored images, the stored images being logically arranged in a plurality of groups, wherein the stored images in one the group have a same set of image content descriptors and different the sets of image capture characteristic descriptors;
finding at least one group of stored images in the data store based on similarity between the set of image content descriptors of the groups of stored images and the set of image content descriptors of the input image;
retrieving the sets of image capture characteristic descriptors associated with the stored images in the at least one found group of stored images;
receiving a selection of a set of image capture characteristic descriptors from amongst the retrieved sets of image capture characteristic descriptors;
retrieving the stored image associated with the selected set of image capture characteristic descriptors, and
generating a manipulated image by performing a style transfer operation on the input image using the retrieved stored image as a reference image,
wherein the data store is created based on analysis of activities of at least one user in relation to images.

14. Apparatus configured to perform image manipulation, the apparatus comprising:
a processor configured to:
receive an input image;
receive a desired style to be transferred to the input image;
obtain a representation of the input image selected from a plurality of stored representations of a plurality of images, wherein each of the plurality of representations comprises data describing a set of image features,
modify at least one of the set of image features in the obtained representation to correspond to the input image and/or the desired style to produce a modified representation;
render a reference image based on the modified representation, and
generate a manipulated image by performing a style transfer operation on the input image using the reference image,
wherein the processor is further configured to:
determine a set of desired image content descriptors of an image to meet user demands;
generate a new image having the set of desired image content descriptors;
obtain a set of image capture characteristic descriptors of the new image; and
add the set of desired image content descriptors and the set of image capture characteristic descriptors obtained for the new image to a data store.

15. A non-transitory computer readable recording medium storing a computer program for performing an image manipulation method, the program performing a method comprising:
receiving an input image;
receiving a desired style to be transferred to the input image;
obtaining a representation of the input image selected from a plurality of stored representations of a plurality of images, wherein each of the plurality of representations comprises data describing a set of image features;
modifying at least one of the set of image features in the obtained representation to correspond to the input image and/or the desired style to produce a modified representation;
rendering a reference image based on the modified representation; and
generating a manipulated image by performing a style transfer operation on the input image using the reference image,
wherein the method further comprises:
determining a set of desired image content descriptors of an image to meet user demands;
generating a new image having the set of desired image content descriptors;
obtaining a set of image capture characteristic descriptors of the new image; and
adding the set of desired image content descriptors and the set of image capture characteristic descriptors obtained for the new image to a data store.

* * * * *